US006815958B2

(12) United States Patent
Kesil et al.

(10) Patent No.: US 6,815,958 B2
(45) Date of Patent: Nov. 9, 2004

(54) METHOD AND APPARATUS FOR MEASURING THICKNESS OF THIN FILMS WITH IMPROVED ACCURACY

(75) Inventors: Boris Kesil, San Jose, CA (US); Leonid Velikov, San Carlos, CA (US); Yuri Vorobyev, San Carlos, CA (US)

(73) Assignee: Multimetrixs, LLC, Santa Clara, CA (US)

( * ) Notice: Subject to any disclaimer, the term of this patent is extended or adjusted under 35 U.S.C. 154(b) by 20 days.

(21) Appl. No.: 10/359,378

(22) Filed: Feb. 7, 2003

(65) Prior Publication Data

US 2004/0155666 A1 Aug. 12, 2004

(51) Int. Cl.[7] ............................................. G01R 27/26
(52) U.S. Cl. ........................................ 324/662; 324/663
(58) Field of Search ............................... 324/662, 663, 324/658, 649, 600, 633, 71.1, 652, 654, 668, 76.51, 230, 232, 236, 318; 331/44, 45, 46, 56; 427/8, 9; 118/102, 204; 438/17

(56) References Cited

U.S. PATENT DOCUMENTS

| | | | | |
|---|---|---|---|---|
| 4,182,986 A | * | 1/1980 | Parker | 324/236 |
| 4,547,745 A | * | 10/1985 | Freitag et al. | 330/286 |
| 4,648,087 A | * | 3/1987 | Scranton et al. | 360/234.7 |
| 5,015,952 A | * | 5/1991 | Doss | 324/236 |
| 5,188,426 A | * | 2/1993 | Stolarczyk et al. | 299/1.2 |
| 5,276,398 A | * | 1/1994 | Withers et al. | 324/318 |
| 5,367,376 A | * | 11/1994 | Lagakos et al. | 356/477 |
| 5,386,195 A | * | 1/1995 | Hayes et al. | 324/662 |
| 5,781,008 A | | 7/1998 | Muller et al. | |
| 6,072,313 A | | 6/2000 | Li et al. | |
| 6,198,279 B1 | * | 3/2001 | Goldfine | 324/232 |
| 6,276,295 B1 | * | 8/2001 | Chen et al. | 118/723 MW |
| 6,306,491 B1 | * | 10/2001 | Kram et al. | 428/315.5 |
| 6,503,816 B2 | * | 1/2003 | Ito et al. | 438/485 |
| 6,716,488 B2 | * | 4/2004 | Fleming et al. | 427/547 |
| 2001/0008158 A1 | * | 7/2001 | Kojima et al. | 152/531 |
| 2004/0100277 A1 | * | 5/2004 | Tam | 324/633 |

OTHER PUBLICATIONS

U.S. patent application Ser. No. 09/954,550, Kesil et al., 2001.
Materials of Staplethorne Ltd. (UK) on the RMS1000 Radiometric System for measuring film thickness.
I. Herman, "Optical Diagnostics for Thin Film Processing", Academic Press, 1996, Chapter 9.
"Semiconductor Material and Device Characterization", John Wiley & Sons, Inc, N.Y., 1990, pp. 2–40, by D. Schroder.

* cited by examiner

Primary Examiner—Anjan Deb
Assistant Examiner—Hoai-An D. Nguyen (57) ABSTRACT

The invention relates to an apparatus and method for measuring thickness and deviations from the thickness of very thin conductive coatings on various non-conductive substrates, or of very thin non-conductive coatings on conductive substrates. The apparatus consists of an inductive coil having specific parameters, an external AC generator operating on frequencies, e.g., from 50 MHz to 2.5 GHz, preferably from 100 MHz to 200 MHz, and a measuring instrument, such as an oscilloscope, voltmeter, etc. for measuring output of the sensor. The coil has miniature dimensions. The invention is based on the principle that inductive coil of the sensor, active resistance of the coil winding, inherent capacitance of the inductive coil (or a separate capacitor built into the sensor's circuit), and the aforementioned AC generator form a parallel oscillating circuit. The apparatus operates on very high resonance frequencies, preferably within the range of 100 to 200 MHz, at which a capacitive coupling is established between the coil of the oscillating circuit and the thin films being measured. By measuring the parameters of the resonance oscillating circuit, it becomes possible to measure film thickness below 500 Angstroms.

19 Claims, 7 Drawing Sheets

Prior Art

METHOD AND APPARATUS FOR MEASURING THICKNESS OF THIN FILMS WITH IMPROVED ACCURACY

FIELD OF THE INVENTION

The present invention relates to the field of measurement of film thickness, more specifically, to measuring thickness of conductive on various conductive substrates or of non-conductive films on various conductive substrates. In particular, the invention may find use in measuring thickness of coating films on semiconductor wafers, hard drive disks, or the like.

BACKGROUND OF THE INVENTION

There exists a great variety of methods and apparatuses used in the industry for measuring thickness of coating films and layers applied or laid onto substrates. These methods and apparatuses can be classified in accordance with different criteria. Classification of one type divides these methods into direct and indirect.

An example of the direct method is measurement of a thickness in thin metal coating films by means of so-called X-ray reflectivity. One of these methods is based on a principle that X-rays and gamma rays are absorbed by matter. When a beam of rays passes through a material, the amount of the beam absorbed depends on what elements the material consists of, and how much of the material the beam has to pass through. This phenomenon is used to measure the thickness or density of a material. The advantage of measuring in this way is that the gauge does not have to touch the material it is measuring. In other words, in thickness measurement, the surface of a web or strip product will not be scratched. The instrument for this method is e.g., RMS1000 Radiometric System produced by Staplethorne Ltd (UK). The instrument uses a suitable radiation source and one or more radiation detectors installed in a mechanical housing which also provides high quality radiological shielding. The source may be an X-ray tube or a radioactive source. The instrument also uses a set of beam defining collimators and one or more radiation detectors. The detectors measure the radiation absorbed within the object or flow being measured and output of the signal data to a computer. For thickness gauging, the collimators usually define a single, narrow beam. This gives optimum spatial resolution.

A disadvantage of radiation methods is the use of X-ray or gamma radiation that requires special safety measures for protection of the users against the radiation. The instruments of this type are the most expensive as compared to metrological equipment of other systems.

Another example of direct measurement is a method of optical interferometry, described e.g., by I. Herman in "Optical Diagnostics for Thin Film Processing", Academic Press, 1996, Chapter 9. Although the optical interferometry method produces the most accurate results in measuring the thickness of a coating film, it has a limitation. More specifically, for conductive films, to which the present invention pertains, this method is limited to measurement of extremely thin coating films which are thin to the extent that a nontransparent material, such as metal, functions as transparent. In other words, this method is unsuitable or is difficult to use for measuring conductive films thicker than 200 Å to 500 Å.

Another example of direct measurement methods is measuring thickness of a film in situ in the course of its formation, e.g., in sputtering, magnetron target sputtering, CVD, PVD, etc. These methods, which are also described in the aforementioned book of I. Herman, may involve the use of the aforementioned optical interferometry or ellipsometry. However, in this case measurement is carried out with reference to both the surface of the substrate and the surface of the growing layer. Therefore, this method is inapplicable to measuring thickness of the film that has been already deposited.

In view of the problems associated with direct methods, indirect non-destructive methods are more popular for measuring thickness of ready-made films. An example of a well-known non-destructive indirect method used for measuring thickness of a film is the so-called "four-point probe method". This method is based on the use of four contacts, which are brought into physical contact with the surface of the film being measured. As a rule, all four contacts are equally spaced and arranged in line, although this is not a compulsory requirement. Detailed description of the four-point probe method can be found in "Semiconductor Material and Device Characterization" John Wiley & Sons, Inc., N.Y., 1990, pp. 2–40, by D. Schroder. The same book describes how to interpret the results of measurements. This method is classified as indirect because the results of measurement are indirectly related to the thickness of the film. It is understood that each measurement of electric characteristics has to correlated with the actual thickness of the film in each particular measurement, e.g., by cutting a sample from the object and measuring the thickness of the film in a cross-section of the sample, e.g., with the use of an optical or electron microscope. Nevertheless, in view of its simplicity, low cost, and convenience of handling, the four-point probe method is the most popular in the semiconductor industry.

However, the four-point method has some disadvantages. The main problem associated with the aforementioned four-point probe method is that in each measurement it is required to ensure reliable contact in each measurement point. This is difficult to achieve since conditions of contact vary from sample to sample as well as between the four pointed contact elements of the probe itself in repeated measurement with the same probe. Such non-uniformity affects the results of measurements and makes it impossible to perform precision calibration.

Known in the art are also methods for measuring film thickness with the use of inductive sensors. For example, U.S. Pat. No. 6,072,313 issued in 2000 to L. Li et al. describes in-situ monitoring and control of conductive films by detecting changes in induced eddy currents. More specifically, the change in thickness of a film on an underlying body such as a semiconductor substrate is monitored in situ by inducing a current in the film, and as the thickness of the film changes (either increase or decrease), the changes in the current are detected. With a conductive film, eddy currents are induced in the film by generating an alternating electromagnetic field with a sensor, which includes a capacitor and an inductor. The main idea of the apparatus of U.S. Pat. No. 6,072,313 consists in using a resistor and a capacitor in a parallel resonance circuit. The resonance is caused by means of an oscillator. The inductive coupling between the oscillation circuit and the Eddy current inducted in the coating is used for improving a signal/noise ratio and can be used for improving quality of measurements. In fact, this is a method well known in the radioelectronics for measuring under conditions of the electrical resonance. The above patent describes the aforementioned inductive method for measuring thickness of a film in chemical mechanical polishing (CMP).

A similar inductive method, which was used for measuring thickness of a slag, is disclosed in U.S. Pat. No.

5,781,008 issued in 1998 to J. Muller et al. The invention relates to an apparatus for measuring the thickness of a slag layer on a metal melt in a metallurgical vessel. The apparatus comprises a first inductive eddy current sensor which indicates the distance of the apparatus from the metal melt as it is moved toward the melt. A second sensor detects when the apparatus reaches a predetermined distance relative to or contacts the slag layer and triggers the inductive eddy-current sensor when such distance is attained. The sensors are arranged in a predetermined spatial relation, and the thickness of the slag layer is determined by an evaluation device, which analyzes the received signals. The apparatus permits measurement of the thickness of the slag layer without the need of additional equipment (e.g. mechanical lance movement or distance measurement).

The method and apparatus of U.S. Pat. No. 5,781,008 relate to macro-measurements of thick layers, and the sensors used in the apparatus of this invention are inapplicable for measuring thickness of thin-film coatings on such objects as semiconductor wafers and hard-drive disks. Furthermore, once the second sensor has detected that the apparatus reached a predetermined distance relative to or contacts the slag layer, this distance remains unchanged during the measurement procedure. This condition is unacceptable for measuring thickness of a thin film with microscopic thickness, which moves relative to the sensor, e.g., for mapping, i.e., for determining deviations of the thickness over the substrate.

In order to understand why the use of known eddy-current sensor systems utilizing a measurement eddy-current sensor and a proximity sensor cannot be easily and directly applicable to measurement of microscopically-thin film coatings on conductive or non-conductive substrates, let us consider constructions and operations of the aforementioned known systems in more detail.

Generally speaking, all inductive sensors are based on the principle that in its simplest form an inductive sensor comprises a conductive coil, which is located in close proximity to a conductive film to be measured and in which an electric current is induced. The conductive film can be considered as a short-circuited virtual coil turn with a predetermined electrical resistance. Since a mutual inductance exists between the aforementioned conductive coil and the virtual coil turn, an electric current is generated in the virtual coil turn. This current is known as eddy current or Foucault current. Resistance of the virtual coil turn, which depends on the material of the conductive film and, naturally, on its thickness, influences the amplitude of the alternating current induced in the virtual turn. It is understood that the amplitude of the aforementioned current will depend also on the thickness of the conductive film.

However, realization of a method and apparatus based on the above principle in application to thin films is not obvious. This is because such realization would involve a number of important variable parameters which depend on a specific mode of realization and which are interrelated so that their relationships not always can be realized in a practical device.

In order to substantiate the above statement, let us consider the construction of an inductive sensor of the aforementioned type in more detail.

Figures 1, 2:
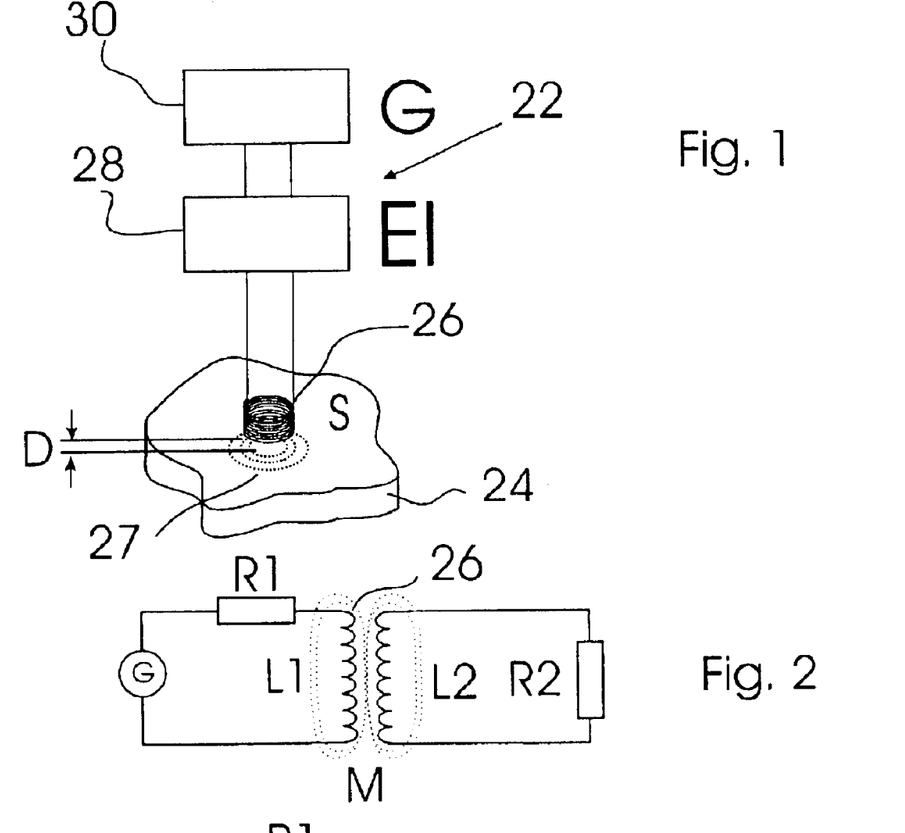
FIG. 1 is a schematic view of a known inductive sensor.
FIG. 2 is an equivalent electric circuit of the sensor of FIG. 1.

FIG. 1 is a schematic view of a known inductive sensor used, e.g., for positioning of an inductive sensor 22 relative to the surface S of an object 24. Let us assume that the surface S of the object 24 is conductive. The inductive sensor comprises an electromagnetic coil 26 connected to an electronic unit 28, which, in turn, is connected to a signal processing unit 30. The latter can be connected, e.g., to a computer (not shown). The electronic unit 28 may contain a signal oscillator (not shown), which induces in the electromagnetic coil 26 an alternating current with a frequency within the range from several kHz to several hundred KHz. In FIG. 1, symbol D designates the distance between the electromagnetic coil 26 and the surface S.

In a simplified form, the sensor of FIG. 1 can be represented by a model shown in FIG. 2. In this model, L1 designates inductance of the electromagnetic coil 26; R1 designates resistance of the coil 26; L2 designates inductance of the aforementioned virtual coil turn 27 (FIG. 1); and R2 is electrical resistance of the aforementioned virtual coil turn 27. M designates mutual induction between L1 and L2.

It can be seen from the model of FIG. 2 that the amplitude of current I generated in coil 26 will depend on R1, L1, L2, R2 and M. It is also understood that in this influence M is the most important parameter since it directly depends on the distance D (FIG. 1) from the inductive sensor 22 to the surface S.

Figure 3:
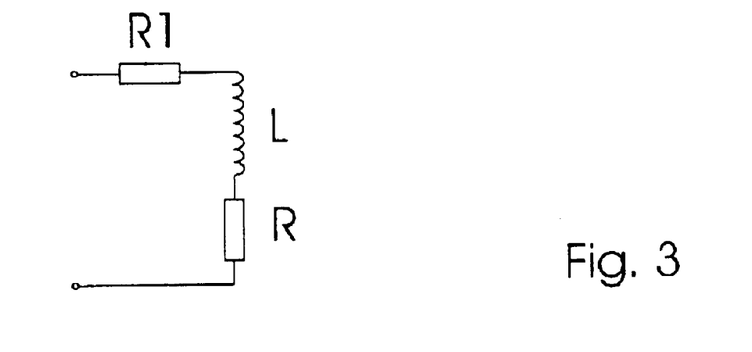
FIG. 3 is a simplified equivalent electrical circuit of the sensor of FIGS. 1 and 2.

FIG. 3 is further simplification of the model of FIG. 2. Parameters L and R are functions that can be expressed in terms of L1, L2, M, R1, and R2. Therefore, as shown in FIG. 3, these parameters can be considered as functions L(D) and R(D), where D is the aforementioned distance (FIG. 1).

The model of FIG. 3 can also be characterized by a quality factor Q, which is directly proportional to the frequency of the current in the sensor coil 26, to inductance of the sensor of FIG. 3, and is inversely proportional to a distance D (FIG. 1) from the sensor coil 26 to the surface S. The higher is the value of Q, the higher is stability of the measurement system and the higher is the measuring accuracy. Thus it is clear that in order to achieve a higher value of Q, it is necessary to operate on higher frequencies of the alternating currents in the inductance coil 26. Analysis of relationships between Q, L, and R for a fixed distance D was made by S. Roach in article "Designing and Building an Eddy Current Position Sensor" at http://www.sensormag.com/articles/0998/edd0998/main.shtml. S. Roach introduces an important parameter, i.e., a ratio of D to the diameter of the sensor coil 26, and shows that R does not practically depend on the above ratio, while the increase of this parameter leads to the growth in L and Q. When distance D becomes equal approximately to the diameter of the coil 26, all three parameters, i.e., L, Q, and R are stabilized, i.e., further increase in the distance practically does not change these parameters. In his important work, S. Roach generalized the relationships between the aforementioned parameters and showed that, irrespective of actual dimensions of the sensor, "the rapid loss of sensitivity with distance strictly limits the range of eddy current sensor to about ½ the coil diameter and constitutes the most important limitation of this type of sensing".

The impedance of the coil also depends on such factors as film thickness, flatness of the film, transverse dimensions, temperature of the film and coil, coil geometry and DC resistance, operating frequency, magnetic and electric properties of the film, etc.

As far as the operating frequency of the inductive coil is concerned, the sensor possesses a self-resonance frequency, which is generated by an oscillating circuit formed by the power-supply cable and the capacitor. As has been shown by S. Roach, in order to improve sensitivity, it is recommended to increase the quality factor Q and hence the frequency. However, the sensor must operate on frequencies at least a factor of three below the self-resonant frequency. Thus, practical frequency values for air core coils typically lie between 10 kHz and 10 MHz.

The depth of penetration of the electromagnetic field into the conductive film is also important for understanding the principle of operation of an inductive sensor. It is known that when an alternating electromagnetic field propagates from non-conductive medium into a conductive medium, it is dampened according to an exponential law. For the case of propagation through the flat interface, electric and magnetic components of the alternating electromagnetic field can be expressed by the following formulae:

$$E=E_0 \exp(-\alpha x)$$

$$H=H_0 \exp(-\alpha x),$$

where $\alpha=(\pi f \mu \sigma)^{1/2}$, f is oscillation frequency of the electromagnetic field, $\sigma$ is conductivity of the medium, and $\mu=\mu_0=1.26\times10^{-6}$ H/m (for non-magnetic materials).

Distance x from the interface, which is equal to $$x=\delta=1/\alpha=1/(\pi f \mu \sigma)^{1/2} \quad (1)$$

and at which the amplitude of the electromagnetic wave decreases by e times, is called the depth of penetration or a skin layer thickness. Based on formula (1), for copper on frequency of 10 kHz the skin depth $\delta$ is equal approximately to 650 $\mu$m, on frequency of 100 kHz to 200 $\mu$m, on frequency of 1 MHz to 65 $\mu$m, on frequency of 10 MHz to 20 $\mu$m, on frequency 100 MHz to 6.5 $\mu$m, and on frequency 10 GHz to 0.65 $\mu$m.

The above values show that for the films used in the semiconductor industry, which are typically with the thickness on the order of 1 $\mu$m or thinner, the electromagnetic field can be considered practically as uniform. This is because on any frequency in the range from 10 KHz to 10 MHz the electromagnetic waves begin to dampen on much greater depth than the thickness of the aforementioned films. It is only on frequencies substantially greater than 100 MHz (e.g., 10 GHz), the depth of penetration of the electromagnetic fields becomes comparable with the thickness of the film.

Similar trend is observed in the films made from other metals, where the skin layer is even thicker because of lower conductivity. At the same time, deviations from uniformity in the thickness of the conductive coating films used in the semiconductor industry, e.g., copper or aluminum layers on the surface of silicon substrates, should not exceed 5%, and in some cases 2% of the average thickness of the layer. In other words, the deviations should be measured in hundreds of Angstroms. It is understood that conventional inductive sensors of the types described above and used in a conventional manner are inapplicable for the solution of the above problem. Furthermore, in order to match conditions of semiconductor production, such sensors must have miniature constructions in order to be installed in close proximity to the measurement site. The distance between the measurement element of the inductive sensor and the surface of the film being measured also becomes a critical issue. Due to high sensitivity, the sensor becomes very sensitive to the influence of the environment, especially, mechanical vibrations, variations in temperature, etc.

In their previous U.S. patent application Ser. No. 09/954,550 filed on Sep. 17, 2001, the applicants made an attempt to solve the above problems by developing a method and apparatus for measuring thickness and deviations from the thickness of thin conductive coatings on various substrates, e.g., metal coating films on semiconductor wafers or hard drive disks. The thickness of the films may be as small as fractions of microns. The apparatus consists of an inductive sensor and a proximity sensor, which are rigidly interconnected though a piezo-actuator used for displacements of the inductive sensor with respect to the surface of the object being measured. Based on the results of the operation of the proximity sensor, the inductive sensor is maintained at a constant distance from the controlled surface. Variations in the thickness of the coating film and in the distance between the inductive sensor and the coating film change the current in the inductive coil of the sensor. The inductive sensor is calibrated so that, for a predetermined object with a predetermined metal coating and thickness of the coating, variations in the amplitude of the inductive sensor current reflect fluctuations in the thickness of the coating. The distinguishing feature of the invention resides in the actuating mechanism of microdisplacements and in the measurement and control units that realize interconnection between the proximity sensor and the inductive sensor via the actuating mechanism. The actuating mechanism is a piezo actuator. Measurement of the film thickness in the submicron range becomes possible due to highly accurate dynamic stabilization of the aforementioned distance between the inductive sensor and the object. According to one embodiment, the distance is controlled optically with the use of a miniature interferometer, which is rigidly connected to the inductive sensor. According to another embodiment, the distance is controlled with the use of a capacitance sensor, which is also rigidly connected to the inductive sensor.

However, the sensor disclosed in the aforementioned patent application could not completely solve the problems associated with accurate measurement of super-thin films, e.g., of those thinner than 500 Angstroms. This is because the construction of the aforementioned sensor is limited with regard to the range of operation frequencies, i.e., the sensor cannot be use in frequencies exceeding 30 MHz. Furthermore, the aforementioned sensor requires the use of a complicated distance-stabilization system. The above problems restrict practical application of the method and apparatus of U.S. patent application Ser. No. 09/954,550 for measuring thickness of very thin films and deviations from the thickness in the aforementioned films. Furthermore, it is obvious that the aforementioned method and apparatus do not allow thickness measurement of non-conductive films. The sensor has relatively large overall dimensions and comprises a stationary measurement instrument.

Another disadvantage of the sensor of the aforementioned application is that it is very sensitive to the distance between the sensor and the film. This requirement dictates the use of expensive and complicated distance-measurement means such as microinterferometers or microscopes.

SUMMARY OF THE INVENTION

It is an object of the invention to provide an apparatus and method for measuring thickness and thickness fluctuation in coating films, in particular in very thin films, e.g., below 500 Angstroms. It is another object to provide the method and apparatus for measuring thickness of very thin conductive films on a non-conductive substrate, or of non-conductive films in conductive substrates. Still anther object is to provide a sensor of the aforementioned type, which is simple in construction and can be produced in the form of a portable miniature device which can be mounted on platforms of optical measurement instruments such as interferometers, spectrophotometers, ellipsometers, or the like. Still another object is to provide an apparatus of the aforementioned type which is less sensitive to a distance between the sensor and the surface of the film being measured.

The invention relates to an apparatus for measuring thickness and deviations from the thickness of very thin conductive coatings on various non-conductive substrates, or of very thin non-conductive coatings on conductive substrates. The apparatus consists of an inductive coil having specific parameters, an external AC generator operating on frequencies, e.g., from 50 MHz to 2.5 GHz, preferably from 100 MHz to 200 MHz, and a measuring instrument, such as an oscilloscope, voltmeter, etc. for measuring output of the sensor. The coil has miniature dimensions. The invention is based on the principle that inductive coil of the sensor, active resistance of the coil winding, capacitance of the inductive coil (or a separate capacitor built into the sensor's circuit), and the aforementioned AC generator form a parallel oscillating circuit. The main distinction of the sensor of the invention from all conventional devices of this type is that it operates on very high resonance frequencies or on frequencies close to very high resonance, preferably within the range of 100 to 200 MHz. In order to maintain the aforementioned high frequency range, the oscillating circuit should have specific values of inductance L (several nano-Henries) and capacitance C (several pico-Farades), and in order to provide accurate measurements, the Q-factor on the above frequencies should exceed 10. It has also been found that on such frequencies the inductive-type coupling that exists in conventional Eddy-current sensors for measuring film thickness acquires a secondary meaning, and that the primary role is transferred mainly to a capacitive coupling between the coil of the oscillating circuit and the thin films being measured. This capacitive coupling determines new relationship between the parameters of the film, mainly the film thickness, and parameters of the resonance oscillating circuit. By measuring the parameters of the resonance oscillating circuit, it becomes possible to measure film thickness below 500 Angstroms.

DETAILED DESCRIPTION OF THE INVENTION

Figure 4:
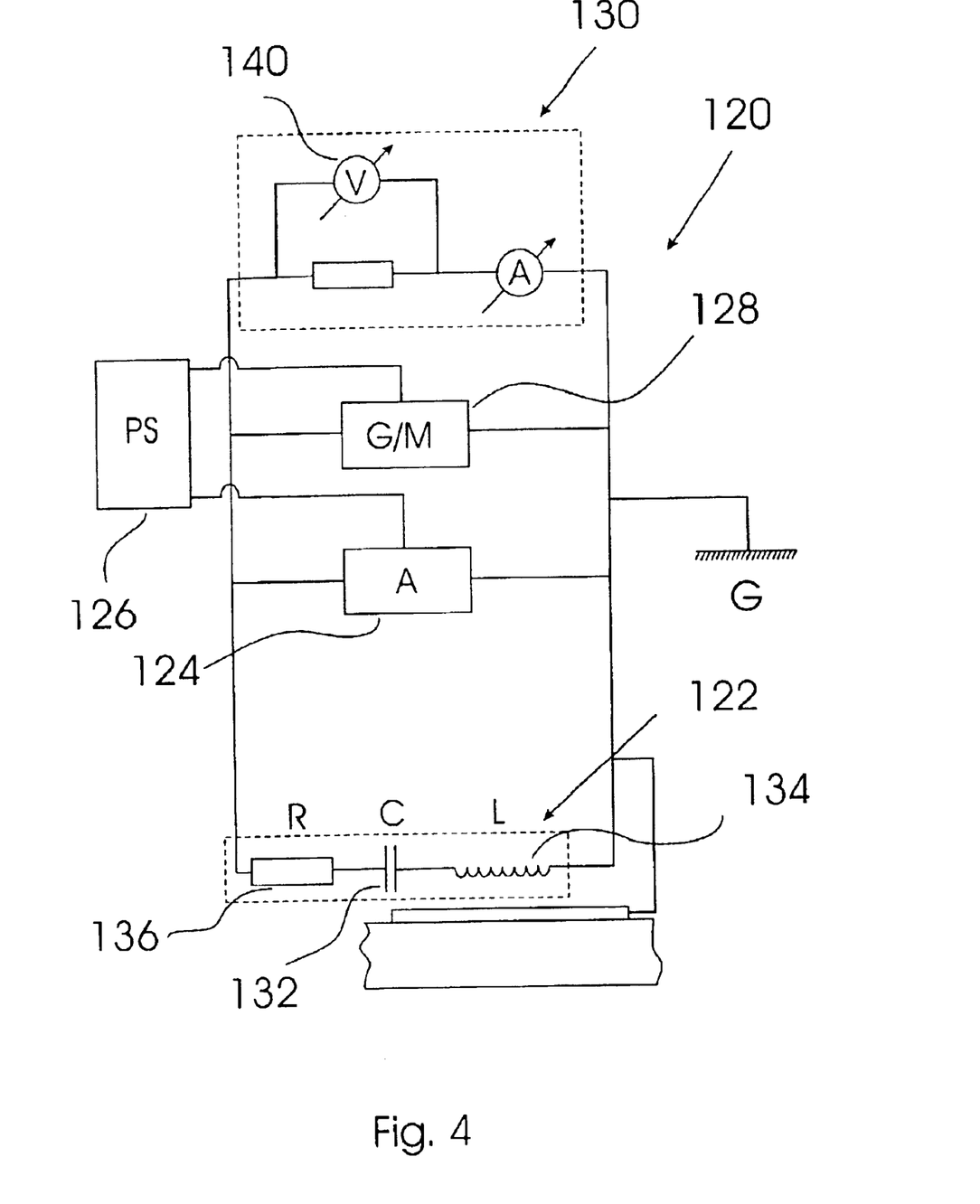
FIG. 4 is a schematic diagram of the apparatus of the invention for measuring thickness of a thin film.

A schematic diagram of an apparatus of the invention for measuring thickness of a thin film is shown in FIG. 4. The apparatus, which in general is designated by reference numeral 120, consists of a sensor 122 connected in parallel with an amplifier 124 connected to a power source 126, a high-frequency AC generator 128 with an amplitude modulator M, and a measurement unit 130. The sensor 122 comprises a resonance oscillating circuit formed by a capacitor 132, an inductance 134, and a resistor 136 connected in series. The inductance comprises the winding of the inductive coil. Although the capacitor 132 and resistor 136 are shown as separate physical element, they may comprise the inherent capacitance and resistance of the inductive coil 136. The aforementioned oscillating circuit may also be characterized by a specific inherent resonance frequency. The circuit that contains the amplifier consists of the amplifier 124 and the power supply 126 and is connected in parallel across the ground G and the sensor 122. The circuit that consists of the high-frequency AC generator 128 with the amplitude modulator M is connected in parallel between the ground G and the sensor 122.

The measurement unit 130 may consist of a voltmeter 140 included into the circuit of the apparatus as shown in FIG. 4.

Figure 5:
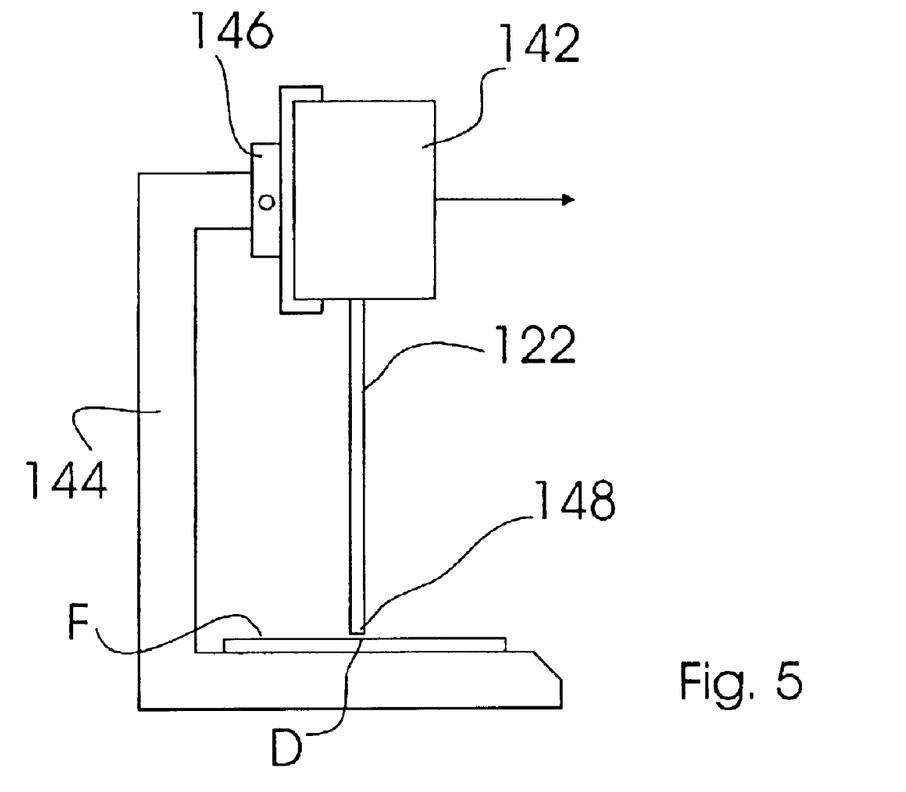
FIG. 5 is a side view of the apparatus of the invention illustrating arrangement of a sensor with respect to the object being measured.

In an actual construction of the apparatus of the invention, which is shown in FIG. 5, the inductive coil 136, the capacitor 132, and the resistor 136, which may be represented by the capacitance and the resistance of the coil, respectively, may be formed as a thin rod that project outer the sensor's body 142. Reference numeral 144 designates a mounting frame that supports the sensor's body 142. Position of the sensor body 142 relative to the mounting frame can be adjusted by means of a micro-adjustment mechanism, e.g., a screw 146. Accuracy of micro-adjustment (about 5 microns or less) for positioning the tip of the rod 122 with respect to the surface of the film F with the use of the screw 146 is sufficient for accurate measurements. This is because the distance D between the tip of the rod 122 and the surface of the film is about 100 to 300 microns and because, as has been mentioned above, the capacitance between tip of the probe 122 and the surface of the film F is inversely proportional to the distance between the both. Respectively, the electrical resistance for alternating current through the gap D between the tip of the probe 122 and the surface of the film F will drop proportionally to a decrease in the distance D.

It is understood that the schematic presentation shown in FIG. 5 is given only as an example and that in view of miniature dimensions of the sensor 122 it can be held by any appropriate holder that can be stationary and rigidly fixed in place.

For better understanding the principle of the present invention, it would be advantageous to consider some theoretical issues incorporated into the apparatus of the invention.

Figure 6:
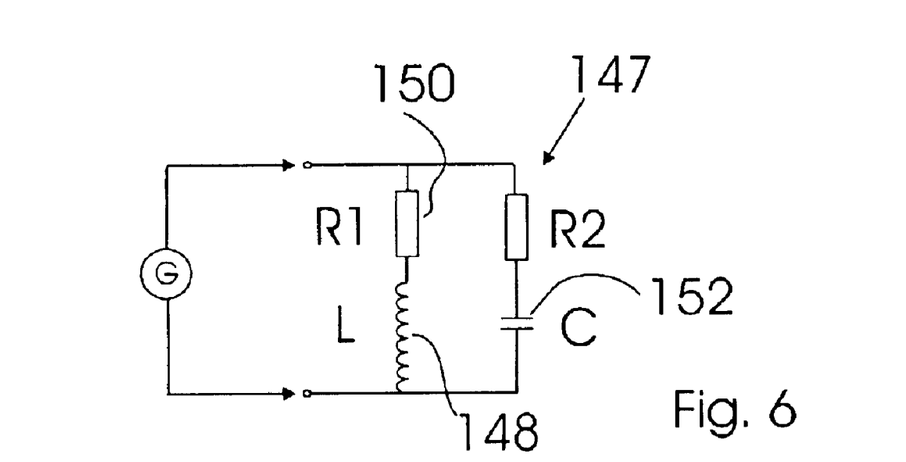
FIG. 6 is an equivalent electric circuit of the apparatus of the invention.

In the range of frequencies in which the apparatus of the invention operates (hundreds of MHz), a system "sensor/film" can be represented by an equivalent electric circuit 147, which is shown in FIG. 6 and which is essentially different from the electrical equivalent circuit of a conventional Eddy-current sensor shown in FIG. 3. The resonance oscillating circuit 147 of FIG. 6 comprises a typical parallel resonance oscillating circuit with losses. The resonance circuit 147 of FIG. 6 consists of an inductance in the form of a coil 148, an active resistance 150 of the coil 148, a capacitor 152, which may comprise capacitance of the coil 148 and of the aforementioned gap between the tip of the probe 122 and the surface of the film F, a high-frequency AC generator, and the active resistance on the portion of the film F which is included into resonance oscillating circuit shown in FIG. 6. With the distance "D" on the order of hundreds of microns, the capacitance between the sensor and the film may be on the same order as the inherent capacitance of the coil as well as the capacitance of the oscillation circuit as a whole. Therefore, the resonance of the oscillating circuit 147 of FIG. 6 will to a large extent be determined by the capacitance in the "sensor/film" system, as well as by the resistance of the resistor $R_2$, i.e., by the electrical resistance of the film F.

It is also appreciated that the resistance $R_2$ of the part of film F which passes the current depends on the thickness of the film F. Therefore the thickness of the film can be expressed in terms of the resonance frequency and the Q-factor of the resonance oscillating circuit of FIG. 6. Let us consider how the frequency characteristics of the aforementioned oscillating circuit 147 depend on the loss of energy in the active elements of the circuit 147. The resonance frequency of the resonance oscillating circuit shown in FIG. 6 is determined with the use of the complex conductivity equation:

$$Y = Y_{RL} + Y_{RC} = 1/(R_1 + j\omega L) + 1/(R_2 + j/\omega C).$$

This equation can be converted into the following form:

$$Y = (R_1 - j\omega L)/[R_1^2 + (\omega L)^2] + \omega C(R_2 \omega C + 1)/[(R_2 \omega C)^2 + 1] = \alpha - j\beta$$

The imaginary part of the obtained expression determines reactive conductivity $\beta = \omega L/[R_1^2 + (\omega L)^2] - \omega C/[(R_2 \omega C)^2 + 1]$.

As is known, the resonance frequency may exist under condition $\beta = 0$, or $\omega L/[R_1^2 + (\omega L)^2] - \omega C/[(R_2 \omega C)^2 + 1] = 0$.

Based on simple calculations, one can obtained the resonance frequency as follows:

$$\omega_0 = 1/(LC)^{1/2} \times [(I - R_1^2 C)/(I - R_2^2 C)]^{1/2} \quad (1a)$$

Analysis of equation (1a) allows us to make an important conclusion, i.e., at relatively high values of $R_1$ or $R_2$, or of both, non-resonance condition may occur. However, the value of $R_1$ may be reduced by selecting a material and thickness of the probe wire that determine inductance L. Within the range of operating parameters of the resonance circuits (L, C, $\omega$), the values $R_2$ that could provide resonance-free conditions were not experimentally obtained. It is understood that $R_2$ can be easily derived from equation (1) as follows:

$$R_2^2 = L/C + (R_1^2/LC - 1/C^2)/\omega_0^2 \quad (2).$$

All values located in the right side of equation (2) can be measured. However, measurement of induced capacitance C may present a problem. Therefore, in order to simplify determination of $R_2$, it would be advantageous to precalibrate the circuit, the more so, it is not exactly known how $R_2$ is related to the actual thickness of the film being measured. The calibration process may be carried out by measuring $R_2$ in films of different thickness but of the same material, e.g., by means of the aforementioned X-ray analysis.

Figure 7:
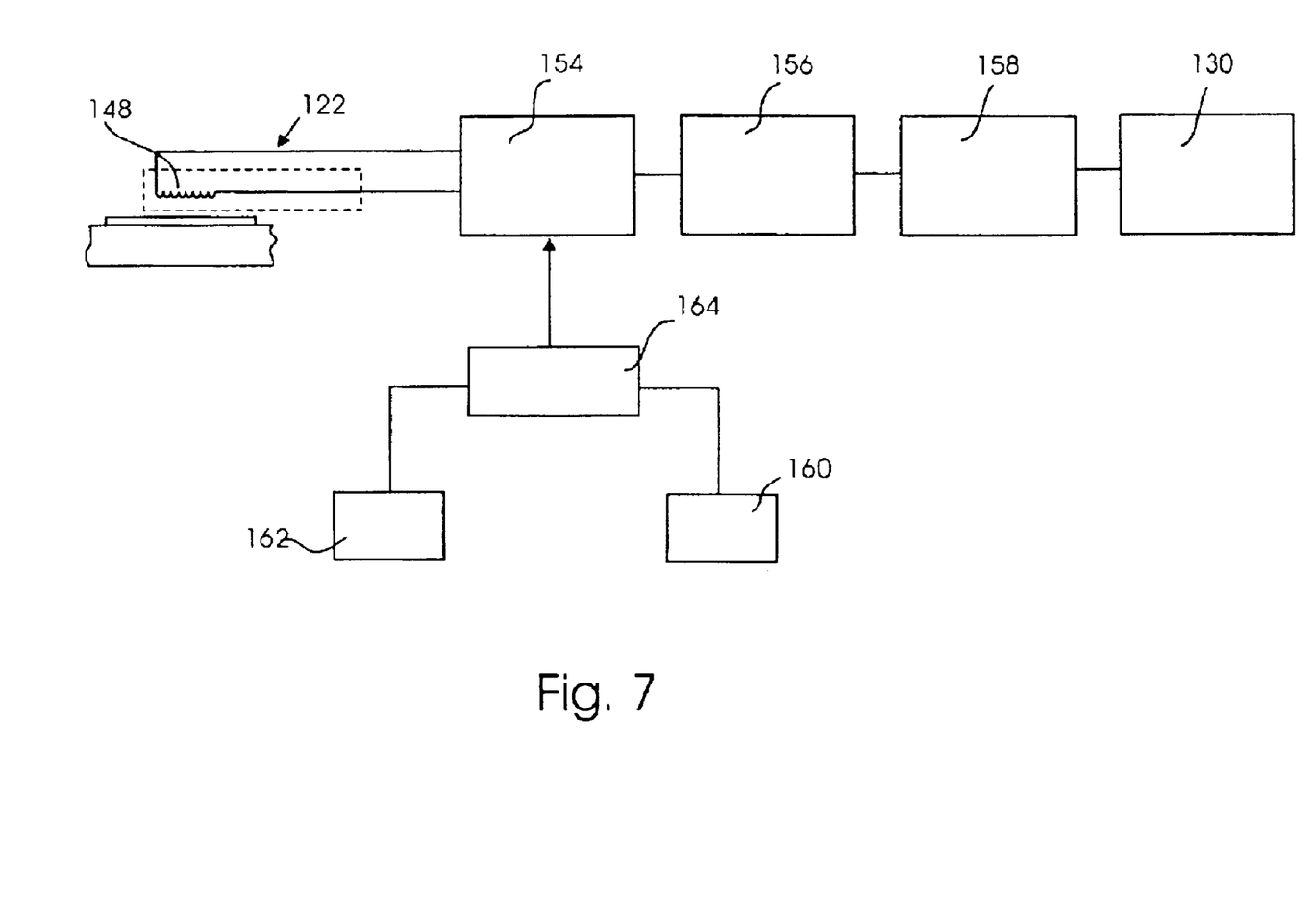
FIG. 7 is a block diagram of the apparatus of the invention with measurement and control units.

A block diagram of the apparatus of the invention for measuring the thickness of a thin film, e.g., thinner than 500 Angstroms by the method of the invention is shown in FIG. 7. The system consists of the following main units: the probe 122 with the coil 148, which is connected with an amplifier 154, which, in turn, is connected to a demodulator 156. The demodulator 156 is coupled to an audio-frequency amplifier 58, and the latter is connected to the measurement unit 130. One of the main parts of the system of FIG. 7 is a carrier-frequency generator 160 (e.g., from 100 to 300 MHz). This can be a variable-frequency or a constant-frequency generator for generating frequency that corresponds to the resonance frequency of the oscillating circuit of FIG. 6. Reference numeral 162 designates an audio-frequency generator for a variable frequency, e.g., of 400 Hz to 25 KHz. The output signals of both generators 160 and 162 are mixed in a signal modulator 164, which excites an AC current in the coil 148 of the sensor via appropriate electric circuits (not shown).

Figure 8:
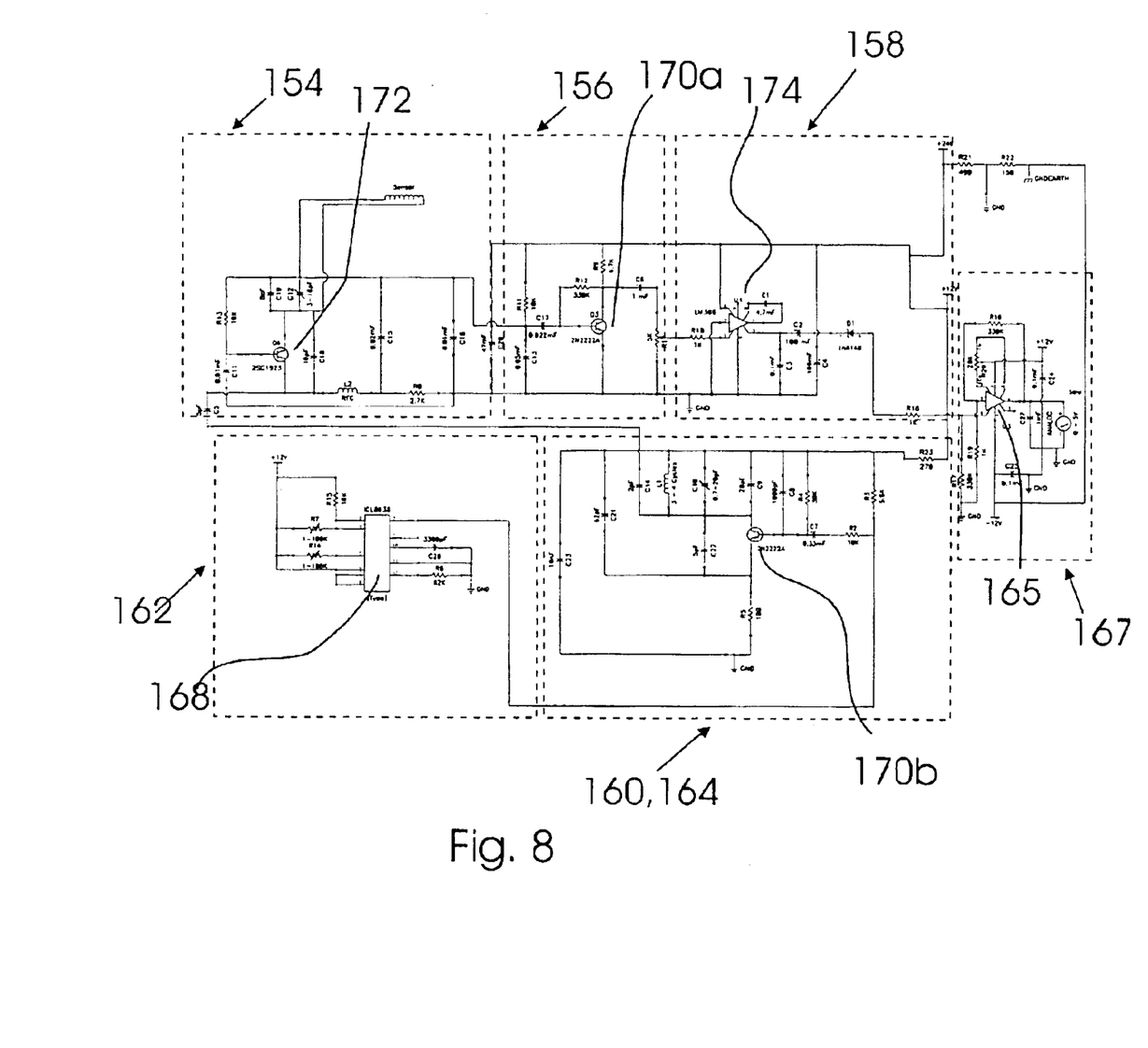
FIG. 8 is one embodiment of an electronic circuit of the apparatus of the invention.
Figure 9:
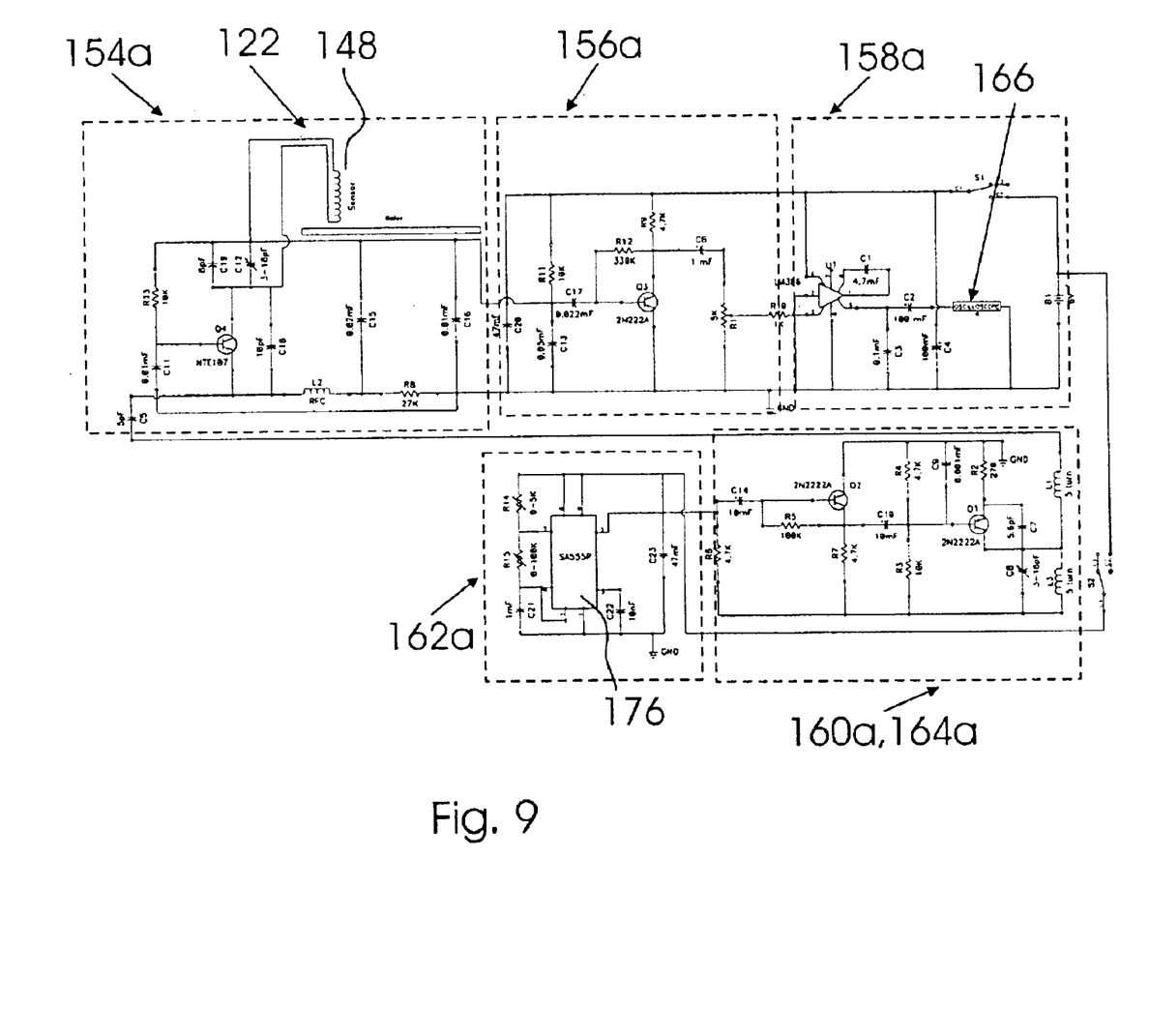
FIG. 9 is another embodiment of an electronic circuit of the apparatus of the invention.

Examples of principle electronic circuits of the apparatus of the invention are shown in FIG. 8 and FIG. 9. The circuit of FIG. 8 is based on measuring direct current obtained by rectifying harmonic or non-harmonic audio signals in the aforementioned range of 400 Hz to 25 KHz and by amplifying the obtained DC signal with the use of an amplifier 165 (OP-77). This signal is then measured by means of an analog or digital voltmeter 167 with subsequent processing on a computer (not shown). In the generator 162, the sinusoidal signals of the frequency to be measured are generated by unit 168 (ICL8038). In the circuit of FIG. 8, the main units of the block diagram of FIG. 7 are shown by broken-line blocks and are designated by the same reference numerals. The unit formed by the generator of the carrier frequency and the modulator (160, 164), and the demodulator 156 are built on the same transistors 170a and 170b (2N2222A). The RF amplifier 154 utilizes the transistor 172 (2SC1923). The audio-frequency amplifier 158 is built on the use of a chip 174 (LM386).

The circuit of FIG. 9 in general is similar to the circuit of FIG. 8 but is based on measuring harmonic or non-harmonic audio signals in the aforementioned range of 400 Hz to 25 KHz with the use of an oscilloscope or oscilloscope-computer 166 with digital data processing of the signals. Those units and elements of circuits of FIGS. 8 and 9, which are identical, are designated by the same reference numerals with an addition of symbol "a" for elements of FIG. In addition to unit 168 (ICL8038) of the circuit of FIG. 8, the circuit of FIG. 9 may use a pulse generator 176 (SA555P). Furthermore, the unit formed by the generator of the carrier frequency and the modulator (160a, 164a) is based on the use of two transistors.

Figure 10:
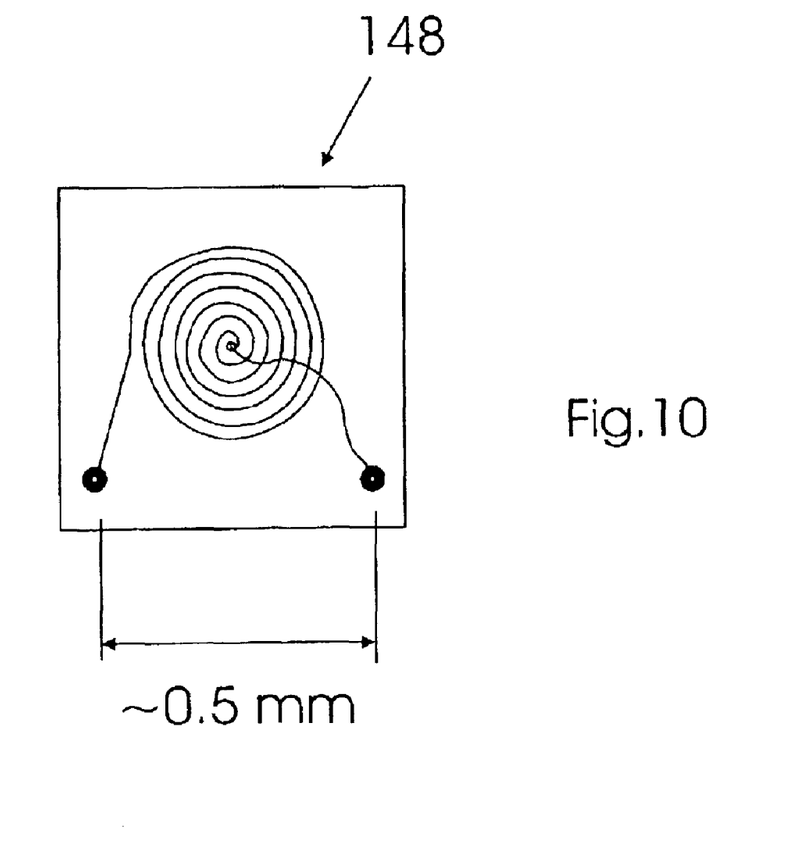
FIG. 10 is a top view that illustrates the sensor of the apparatus of the invention in the form of a flat spiral pattern on the end face of the probe.

FIG. 10 illustrates an example of the sensor 122. The coil 148 of the sensor is formed by the methods of submicron lithography in the form of a flat spiral pattern on the end face of the probe of the sensor 122. The gaps between the turns and the thickness of the turns in the spiral pattern may vary from 0.1 micrometer to several micrometers. Resistance $R_1$ (FIG. 6) of the sensor is determined by the number of turns and may be on the order of several Ohms. The number of turns may vary, e.g., from 1 to 50. Inductance L (FIG. 6) of the sensor may vary, e.g., from 1 nano-Henry to 200 nano-Henries. A preferable material for the coil 148 is gold.

Figure 11:
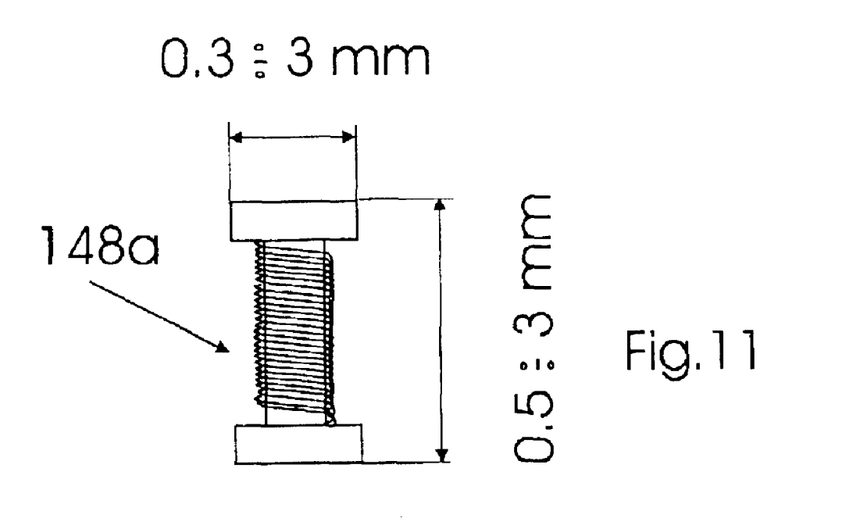
FIG. 11 is a side view that illustrates the sensor of the apparatus of the invention in the form of a helical body on the end of the probe.

FIG. 11 shows another embodiment of the sensor 122. The coil 148a of this sensor has a cylindrical helical shape. The diameter of the coil may be, e.g., with the range of 0.3 to 3 mm, and the height of the coil may vary, e.g., from 0.5 to 3 mm. The coil can be made from a copper wire having a diameter not exceeding 10 micrometers.

The apparatus of the invention operates as follows. First the sensor 122 (FIG. 5) is calibrated by fixing it with respect to the reference film $F_R$ so that a gap D within the range of 10 to 100 micrometers is established between the coil 148 (148a) (FIGS. 10 and 11). The parameters of the reference film $F_R$ (thickness, material, etc.) are known. The probe 122 is moved with the use of the micro-adjustment mechanism 146 until an appropriate direct current signal is obtained on the output of the analog or digital voltmeter 167 (FIG. 8) or until the characteristic oscillogram will be obtained on the oscilloscope 168*a* (FIG. 9). The calibration curve plotted for amplitude versus the film thickness (or another characteristic parameter such as a dielectric constant) is obtained for films of different thickness. The resonance oscillagram of the same type is then established for the film F to be measured, and the thickness of the film is determined by measuring, e.g., the amplitude of the signals on the oscillogram. Then the results of measurements are compared with the oscillogram obtained on the reference film. For measuring deviations from the film thickness uniformity, the aforementioned procedure is repeated in different measurement points.

The case described above related to measurement of thickness in a conductive thin film on a nonconductive substrate. However, the apparatus and method of the invention are equally applicable to measurement of thickness in a nonconductive film on a conductive substrate. In this case, calibration is carried out on a number of identical conductive substrates of the same thickness which are coated with dielectric films having different thickness. The thickness of the thin dielectric films on the conductive substrate is determined, e.g., in terms of C-V characteristics, or with the use of an ellipsometer, spectrophotometer, or the like. The same specimens are used for measuring resonance frequency and Q-factor by the apparatus of the invention under the following conditions: the distance D between the sensor winding 148 and the surface of the conductive substrate with and without the dielectric coating film. These measurements are carried out on the same conductive substrates and dielectric films as in the aforementioned measurements performed by the apparatuses and methods other than in the present invention (ellipsometeric, spectrophotometric measurements, etc.). Relationships are then established between the values of the resonance frequency and Q-factor and corresponding thicknesses of the dielectric films. The thickness of a dielectric coating on a conductive substrate of a product, which has to be tested, is then determined by measuring at least the resonance frequency of the target object. As can be seen from formula (1) given above, the resonance frequency depends on the capacitance C in the gap between the inductance of the sensor winding 148 and the surface of the conductive body, i.e., the conductive substrate or film. In other words, by measuring the aforementioned capacitance C, one can measure the thickness of a dielectric coating on a conductive film by using the calibration procedure described above.

Thus it has been shown that the apparatus and method of the invention are suitable for measuring thickness and thickness fluctuations in very thin films, e.g., below 500 Angstroms. The films may be conductive or non-conductive. The invention also provides a film-thickness control sensor which is simple in construction and can be produced in the form of a portable miniature device which can be mounted on platforms of optical measurement instruments such as interferometers, spectrophotometers, ellipsometers, or the like. The apparatus of the invention is less sensitive to a distance between the sensor and the surface of the film being measured.

Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For example, the circuits of FIGS. 8 and 9 may be assembled from elements different from those shown in the drawings. For improving accuracy of measurements, these circuits may incorporate quartz resonators, which will stabilize the carrier frequency. The apparatus and method of the invention is also applicable to measuring the thickness and non-uniformity of a thin conductive film on a thick conductive substrate of uniform properties. Although the description and examples related to very thin films with the thickness below 500 Angstroms, it is understood that the apparatus and method of the invention are equally applied to thicker films, e.g., up to 2 $\mu$m.

What is claimed is:

1. An apparatus for measuring thickness and deviations from the thickness of a film on a substrate, wherein one of said film and said substrate is a conductive body and the other is a nonconductive body, said apparatus comprising:

sensor means comprising a resonance oscillating circuit characterized by inherent inductance, inherent capacitance, and an inherent resonance frequency;

a high-frequency AC generator with an amplitude modulator connected to said sensor means; and an amplifier connected to said sensor means;

a measurement unit connected to said sensor;

said resonance oscillating circuit having such a relationship between said inherent inductance and inherent capacitance that provides a capacitive coupling via a capacitance induced between said sensor and said film at a distance between said sensor and said film at which said capacitance is on the same order as said inherent capacitance of said oscillating circuit as a whole.

2. The apparatus of claim 1, wherein said inherent resonance frequency is within the range of 50 MHz to 2.5 GHz.

3. The apparatus of claim 1, wherein said inherent resonance frequency is within the range of 100 MHz to 200 MHz.

4. The apparatus of claim 1, wherein said inherent inductance is within the range from 0.1 to 200 nano-Henries and inherent capacitance is within the range of 0.1 to 100 pico-Farades.

5. The apparatus of claim 3, wherein said inherent inductance is within the range from 0.1 to 200 nano-Henries and inherent capacitance is within the range of 0.1 to 100 pico-Farades.

6. The apparatus of claim 2, wherein said inherent inductance is within the range from 0.1 to 200 nano-Henries and inherent capacitance is within the range of 0.1 to 100 pico-Farades.

7. The apparatus of claim 1, wherein said sensor has a sensor winding which is characterized by said inherent inductance, said inherent resistance, and said inherent resonance, said sensor winding being made in the form selected from the group consisting of a flat spiral winding with at least one spiral turn and a helical winding formed by at least one cylindrical helical turn.

8. The apparatus of claim 7, wherein said at least one spiral turn has a diameter not exceeding 0.5 mm, an wherein said at least one cylindrical helical turn has a diameter within the range from 0.3 mm to 3 mm.

9. The apparatus of claim 4, wherein said sensor has a sensor winding which is characterized by said inherent inductance, said inherent resistance, and said inherent resonance, said sensor winding being made in the form selected from the group consisting of a flat spiral winding with at least one spiral turn and a helical winding formed by at least one cylindrical helical turn.

10. The apparatus of claim 9, wherein said at least one spiral turn has a diameter not exceeding 0.5 mm, an wherein said at least one cylindrical helical turn has a diameter within the range from 0.3 mm to 3 mm.

11. A method for measuring thickness and deviations from the thickness of a film on a substrate, wherein one of said film and said substrate is a conductive body having a measurement surface and the other is a nonconductive body having a measurement surface, said method comprising the steps of:

provviding an apparatus comprising a sensor with a resonance oscillating circuit which has a sensor winding characterized by inherent inductance, inherent capacitance, and an inherent resonance frequency, a high-frequency an AC generator with an amplitude modulator connected to said sensor means, an amplifier connected to said sensor means, and a measurement unit connected to said sensor, said resonance oscillating circuit having such a relationship between said inherent inductance and inherent capacitance that provides a capacitive coupling via a capacitance induced between said sensor and said film at a distance between said sensor and said film at which said capacitance is on the same order as said inherent capacitance of said oscillating circuit as a whole;

providing said sensor winding with calibration data obtained by a plurality of measurement procedures, each consisting of fixing said sensor winding with a calibration gap relative to a reference conductive body with calibration parameters known for different value of said thickness;

energizing said resonance oscillating circuit to generate resonance conditions in said sensor winding and approaching said sensor winding towards said conductive body until said capacitive relationship is established between said sensor winding and said measurement surface of said conductive body;

fixing said sensor winding relative to said measurement surface at said distance;

measuring parameters of said film with the use of said measurement unit for obtaining thickness measurement data; and determining the thickness of said film by comparing said thickness measurement data with said calibration data.

12. The method of claim 11, wherein said calibration parameters are selected from the group consisting of resonance frequency, an amplitude of an AC current generated in said resonance oscillating circuit under said resonance condition, and a Q-factor of said resonance oscillating circuit under said resonance condition.

13. The method of claim 12, wherein said conductive body is a conductive coating film on a dielectric substrate.

14. The method of claim 12, wherein said film is said nonconductive body and said substrate is a conductive body.

15. The method of claim 11, wherein said inherent resonance frequency is within the range of 50 MHz to 2.5 GHz.

16. The method of claim 11, wherein said inherent resonance frequency is within the range of 100 MHz to 200 MHz.

17. The method of claim 11, wherein said inherent inductance is within the range from 0.1 to 200 nano-Henries and inherent capacitance is within the range of 0.1 to 100 pico-Farades.

18. The method of claim 15, wherein said inherent inductance is within the range from 0.1 to 200 nano-Henries and inherent capacitance is within the range of 0.1 to 100 pico-Farades.

19. The method of claim 16, wherein said inherent inductance is within the range from 0.1 to 200 nano-Henries and inherent capacitance is within the range of 0.1 to 100 pico-Farades.

* * * * *